United States Patent

Aoki et al.

[11] Patent Number: 6,135,915
[45] Date of Patent: Oct. 24, 2000

[54] METHOD OF TRANSMISSION CONTROL FOR BELT-TYPE STEPLESS TRANSMISSION DEVICE

[75] Inventors: Akihira Aoki; Hiroshi Saotome, both of Wako, Japan

[73] Assignee: Honda Giken Kogyo Kabushiki Kaisha, Tokyo, Japan

[21] Appl. No.: 09/340,511

[22] Filed: Jul. 1, 1999

[30] Foreign Application Priority Data

Jul. 3, 1998 [JP] Japan .................................. 10-188371

[51] Int. Cl.⁷ .................................................. B60K 41/12
[52] U.S. Cl. .................................. 477/43; 477/37; 474/8; 474/17; 701/51; 701/66
[58] Field of Search .................................. 477/43, 44, 46; 474/8, 11, 17, 28, 12; 701/51, 53

[56] References Cited

U.S. PATENT DOCUMENTS

| | | | |
|---|---|---|---|
| 5,427,579 | 6/1995 | Kanehara et al. | 474/28 |
| 5,800,298 | 9/1998 | Kanehara et al. | 474/8 |
| 5,964,818 | 10/1999 | Kanehara et al. | 701/51 |

FOREIGN PATENT DOCUMENTS 8-42652  2/1996  Japan .
8-326857 12/1996  Japan .

*Primary Examiner*—Charles A. Marmor
*Assistant Examiner*—Tisha D. Waddell
*Attorney, Agent, or Firm*—Arent Fox Kintner Plotkin & Kahn, PLLC

[57] ABSTRACT

Drive and driven pulley necessary axial thrusts (Qdrnec, Qdnnec) necessary for power transmission without belt slippage are found in accordance with the input torque and transmission ratio; the vehicle speed and degree of accelerator opening target transmission ratio (itgt) and target rate of change of transmission ratio (ditgt) are found; this axial thrust (Qdnnec) is set as the driven pulley target axial thrust (Qdncmd); and the drive pulley axial thrust necessary to obtain the target values (itgt) and (ditgt) is set as the drive pulley target axial thrust (Qdrcmd). Then, if (Qdrcmd)<(Qdrnec), this axial thrust (Qdrnec) is altered and set as the drive pulley target axial thrust (Qdrcmd) and the driven axial thrust necessary for obtaining the target values (itgt), (ditgt) is altered and set as the driven pulley target axial thrust (Qdncmd). Drive and driven pulley axial thrust control is performed such that these target axial thrusts (Qdrcmd, Qdncmd) are obtained.

5 Claims, 9 Drawing Sheets

METHOD OF TRANSMISSION CONTROL FOR BELT-TYPE STEPLESS TRANSMISSION DEVICE

FIELD OF THE INVENTION

The present invention relates to a method of transmission control for a belt-type stepless transmission device and in particular relates to a method of performing transmission control wherein, by performing control of the hydraulic pressure for pulley width setting of a drive pulley and a driven pulley by electronic control, the axial thrust of both pulleys is controlled.

BACKGROUND OF THE INVENTION

Belt-type stepless transmission devices are already known and supplied for practical use comprising a drive pulley of variable width, a driven pulley of variable width, and a belt member that is engaged with this drive pulley and driven pulley. In such a transmission, there are provided a drive hydraulic actuator that performs pulley width control (axial thrust control) of the drive pulley and a driven hydraulic actuator that performs pulley width control (axial thrust control) of the driven pulley, thereby effecting pulley width setting control by controlling the axial thrust of the two pulleys by means of the hydraulic pressures that are supplied to these two hydraulic actuators, and so enabling the transmission ratio to be varied in stepless fashion.

Various transmission control devices have previously been proposed in order to control the hydraulic pressure supplied to such hydraulic actuators as reliably as possible in response to the running condition. Examples of such transmission control devices are disclosed in Japanese Laid-Open Patent Application H. 8-42652 and Japanese Laid-Open Patent Application H. 8-326857. These devices are arranged such that the pulley axial thrust balance for adjusting the transmission ratio is set by controlling the hydraulic pressure (axial thrust) acting on the driven pulley so as to confer on the pulley the minimum necessary pulley axial thrust (belt clamping force) such as to avoid belt slippage and controlling the hydraulic pressure (axial thrust) acting on the drive pulley.

In this case, the axial thrust of the driven pulley is determined by the belt transmission torque (torque transmitted between the pulleys) and the transmission ratio, the pulley axial thrust ratio of the drive side and driven side is found from the target transmission ratio and the transmitted torque ratio, the deviation of the pulley axial thrust is found from feedback elements of the dynamic transmission characteristic and transmission ratio, and a value obtained by adding the pulley axial thrust deviation to the product of the driven pulley axial thrust and pulley axial thrust ratio is set as the drive axial thrust (hydraulic pressure).

However, in the case of control using a prior art transmission control device as above, there is the problem that, when control was exercised such as to change the transmission ratio abruptly in the increasing direction as in the case of "kick-down", the pulley axial thrust deviation becomes a large negative value, causing a large drop in the drive pulley axial thrust and so giving rise to the possibility of belt slippage. In order to avoid this problem of occurrence of belt slippage, consideration has been given to setting the driven pulley axial thrust at a high level but if this is done the driven pulley axial thrust becomes unnecessarily large during steady running etc., giving rise to the problems of a lowering of efficiency of power transmission and an adverse effect in terms of fuel costs etc.

SUMMARY OF THE INVENTION

With the foregoing in view, it is an object of the present invention to provide a method of transmission control wherein, even in the event of change of transmission ratio such as to considerably lower the axial thrust of the drive pulley, as in the case of kick-down, belt slippage can be avoided using the minimum necessary axial thrust, enabling the target transmission ratio to be achieved.

In order to achieve this object, according to the present invention, the target transmission ratio (itgt) and target rate of change of transmission ratio (ditgt) are found in accordance with the vehicle speed (V) and degree of accelerator opening (th) (degree of opening of the engine throttle, value corresponding to the amount of depression etc. of the accelerator pedal (see block B2 in the embodiment); and the driven pulley necessary axial thrust (Qdnnec) necessary for performing power transmission without belt slippage is found corresponding to the transmission device input torque (Tin) and transmission ratio (i) (see blocks B1, B11, B12 in the embodiment).

Then, the above driven pulley necessary axial thrust (Qdnnec) is set as the driven pulley target axial thrust (Qdncmd), and the axial thrust deemed necessary at the drive pulley for changing the current transmission ratio to the target transmission ratio (itgt) using this driven pulley target axial thrust (Qdncmd) is set as the drive pulley target axial thrust (Qdrcmd) (corresponding to step S1 of FIG. 7 of the embodiment).

Next, the drive pulley target axial thrust (Qdrcmd) and the drive pulley necessary axial thrust (Qdrnec) are compared (corresponding to step S1 of FIG. 7 in the embodiment).

Then, if the drive pulley target axial thrust (Qdrcmd) is larger than the drive pulley necessary axial thrust (Qdrnec), transmission ratio control is performed using the drive pulley target axial thrust (Qdrcmd) and the driven pulley target axial thrust (Qdncmd).

On the other hand, if the drive pulley target axial thrust (Qdrcmd) is smaller than the drive pulley necessary axial thrust (Qdrnec), the drive pulley necessary axial thrust (Qdrnec) necessary to perform power transmission without generating belt slippage in accordance with the transmission device input torque (Tin) and transmission ratio (i) is newly set as the drive pulley target axial thrust (Qdrcmd), and the axial thrust deemed necessary at the driven pulley in order to change the transmission ratio to said target transmission ratio (itgt) with the target rate of change of transmission ratio (ditgt) using the drive pulley target axial thrust (Qdrcmd) is newly set as the driven pulley target axial thrust (Qdncmd) (corresponding to step S3 of FIG. 7 in the embodiment).

Control of the transmission ratio is performed in accordance with the drive and driven target axial thrusts (Qdrcmd, Qdncmd) that are set in this way (blocks B4, B5 in the embodiment).

Thus, according to the present invention, irrespective of the driving conditions (transmission ratio change conditions), the axial thrust of the smaller of the axial thrusts of the drive and driven pulley axial thrusts is set using the drive or driven pulley necessary axial thrust necessary in order to perform power transmission without generating belt slippage and, in addition, since the drive or driven pulley target axial thrust such that the desired transmission ratio and rate of change of transmission ratio are obtained are set as values larger than these pulley necessary axial thrusts, irrespective of driving conditions (for example even in the case of kick-down change of transmission ratio), there is no risk of belt slippage and the desired control of transmission ratio can be achieved. Furthermore, since the smaller pulley axial thrust is the value which is required in order to perform power transmission without generating belt slippage, so that the axial thrust is the minimum value necessary to prevent slippage, there is no possibility of excess axial thrust being applied, whatever the driving conditions.

Further scope of applicability of the present invention will come apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention wherein.

DESCRIPTION OF THE PREFERRED EMBODIMENTS

Figure 1:
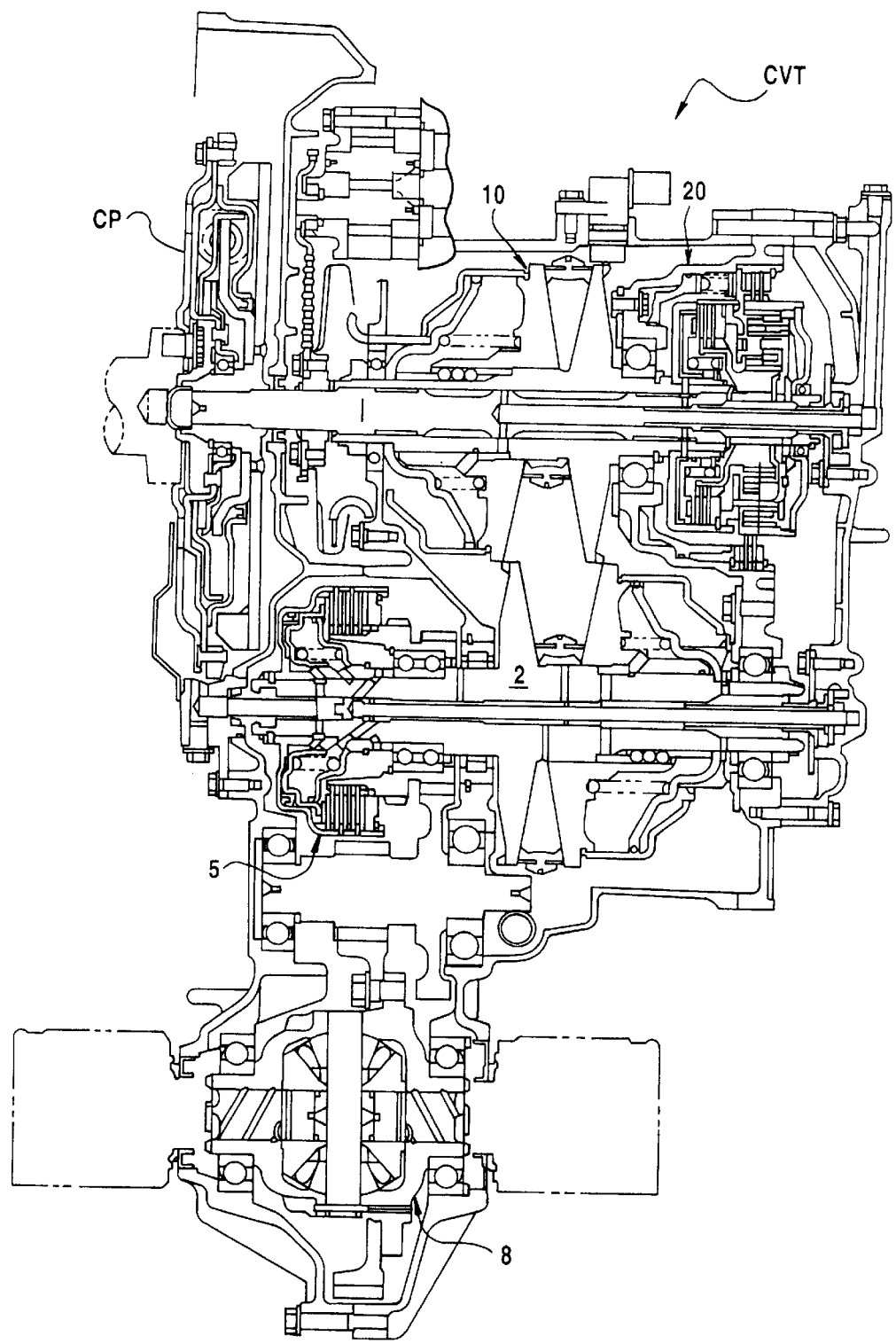
FIG. 1 is a cross-sectional view showing the construction of a belt-type stepless transmission device wherein transmission control is performed in accordance with a method according to the present invention.
Figure 2:
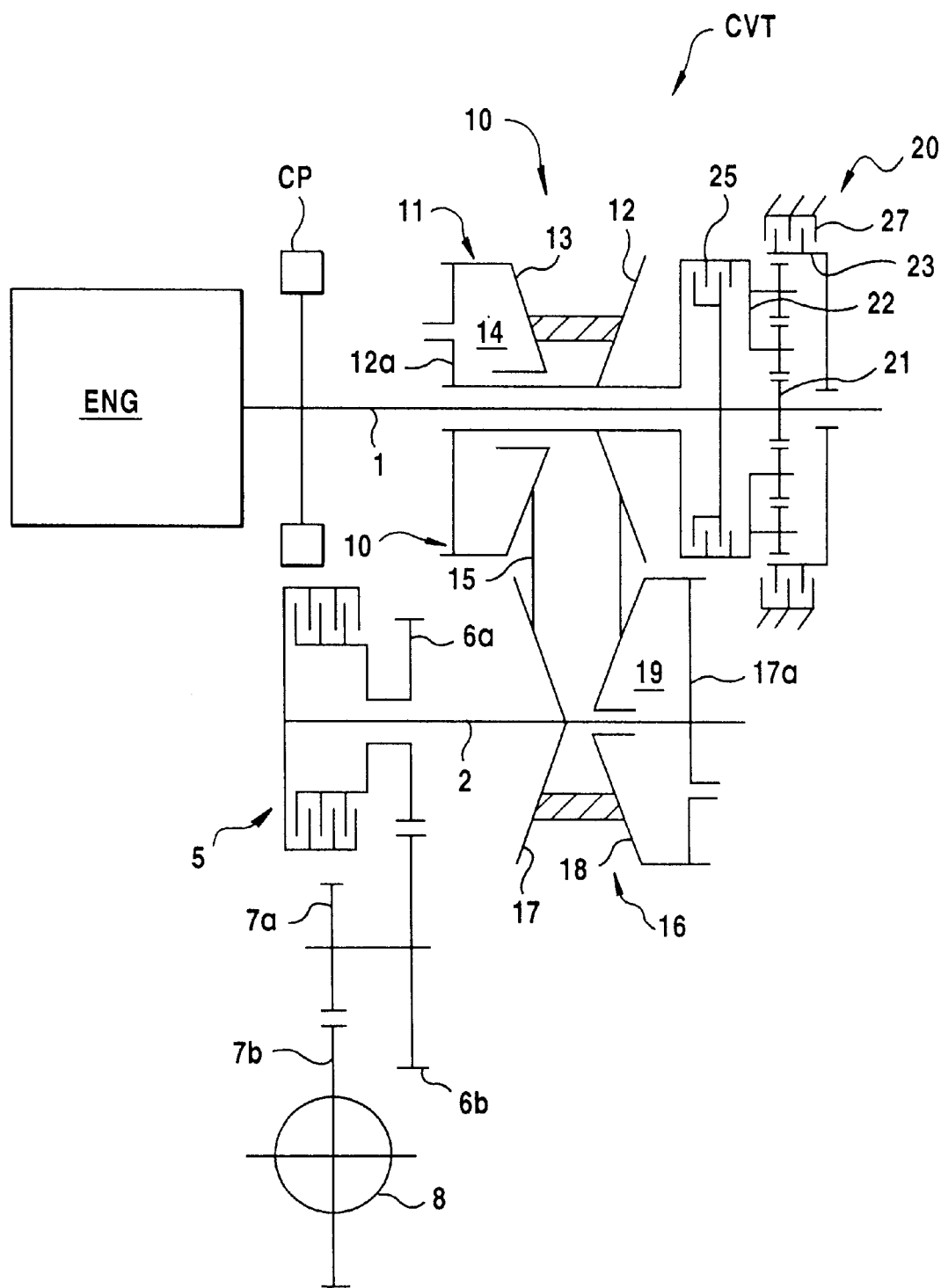
FIG. 2 is a diagram illustrating the power transmission path of this transmission device.

FIG. 1 and FIG. 2 show the construction of a belt-type stepless transmission device wherein transmission control is performed in accordance with a method of transmission control according to the present invention. This belt-type stepless transmission device CVT comprises: a metal V-belt mechanism 10 arranged between an input shaft 1 and counter shaft 2; an epicyclic gear forward/reverse drive changeover mechanism 20 arranged between input shaft 1 and drive side movable pulley 11; and a main clutch 5 arranged between counter shaft 2 and an output member (differential mechanism 8 etc.). This stepless transmission device CVT is employed for a vehicle, input shaft 1 being coupled to the output shaft of an engine ENG through a coupling mechanism CP and power transmitted to a differential mechanism 8 being transmitted to left and right vehicle wheels.

Metal V-belt mechanism 10 comprises: a drive pulley 11 arranged on an input shaft 1, a driven pulley 16 arranged on a counter shaft 2, and a metal V-belt 15 engaged between the two pulleys 11 and 16.

Drive pulley 11 comprises a fixed pulley half 12 freely rotatably arranged on input shaft 1 and a movable pulley half 13 arranged so as to be relatively movable with respect to this fixed pulley half 12. At the side of movable pulley half 13, there is formed a drive cylinder chamber 14 that is enclosed by cylinder wall 12a coupled with fixed pulley half 12, side pressure whereby movable pulley half 13 is moved in the axial direction i.e. axial thrust Qdr of the drive pulley being generated by hydraulic pressure Pdr that is supplied into drive cylinder chamber 14.

Driven pulley 16 comprises: a fixed pulley half 17 that is fixed to counter shaft 2, and a movable pulley half 18 that is relatively movable in the axial direction with respect to this fixed pulley half 17. At the side of movable pulley half 18, there is formed a driven cylinder chamber 19 that is enclosed by cylinder wall 17a coupled with fixed pulley half 17, side pressure whereby movable pulley half 18 is moved in the axial direction i.e. axial thrust Qdn of the driven pulley being generated by hydraulic pressure Pdn that is supplied into driven cylinder chamber 19.

Consequently, by suitably controlling the hydraulic pressures Pdr and Pdn supplied to the above two cylinder chambers 14, 19, appropriate lateral pulley pressure can be set such that slippage of belt 15 cannot occur and the pulley width of the two pulleys 11, 16 can be altered, thereby making it possible to alter the transmission ratio in stepless fashion by changing the radius at which V belt 15 is engaged.

Epicyclic gear forward/reverse drive changeover mechanism 20 comprises a double-pinion type planetary gear train of which sun gear 21 is coupled with input shaft 1 and carrier 22 is coupled with fixed pulley half 12 while ring gear 23 is capable of being held fixed by reverse brake 27. Also, there is provided a forward drive clutch 25 that is capable of being linked with sun gear 21 and ring gear 23 so that when this forward drive clutch 25 is engaged all the gears 21, 22, and 23 rotate integrally with input shaft 1 and drive pulley 11 is driven in the same direction (forwards direction) as input shaft 1. In contrast, when reverse brake 27 is engaged, ring gear 23 is held fixed, so carrier 22 is driven in the opposite direction to sun gear 21, causing drive pulley 11 to be driven in the opposite direction (reverse direction) to input shaft 1.

Main clutch 5 is the clutch that controls the transmission of power between counter shaft 2 and the output side member; when it is engaged, it makes possible transmission of power between these two and by controlling the force with which it is engaged it is possible to control the torque transmission capacity (torque capacity) between the input side and output side. Consequently, when main clutch 5 is engaged, the engine output whose transmission ratio is controlled by metal V belt mechanism 10 is transmitted through gears 6a, 6b, 7a and 7b to differential mechanism 8 and is apportioned and transmitted by this differential mechanism 8 to left and right vehicle wheels (not shown). Also, when main clutch 5 is disengaged, this power transmission is not effected and the transmission device is put into a neutral condition.

The transmission control device according to the present invention controls the supplied hydraulic pressures Pdr and Pdn of the drive cylinder chamber and the driven cylinder chamber 14 and 19, thereby controlling the drive pulley and driven pulley axial thrusts Qdr and Qdn such that the minimum necessary axial thrusts are set such that belt slippage does not occur and appropriate transmission ratio control is effected; details of this control are described below.

Figure 3:
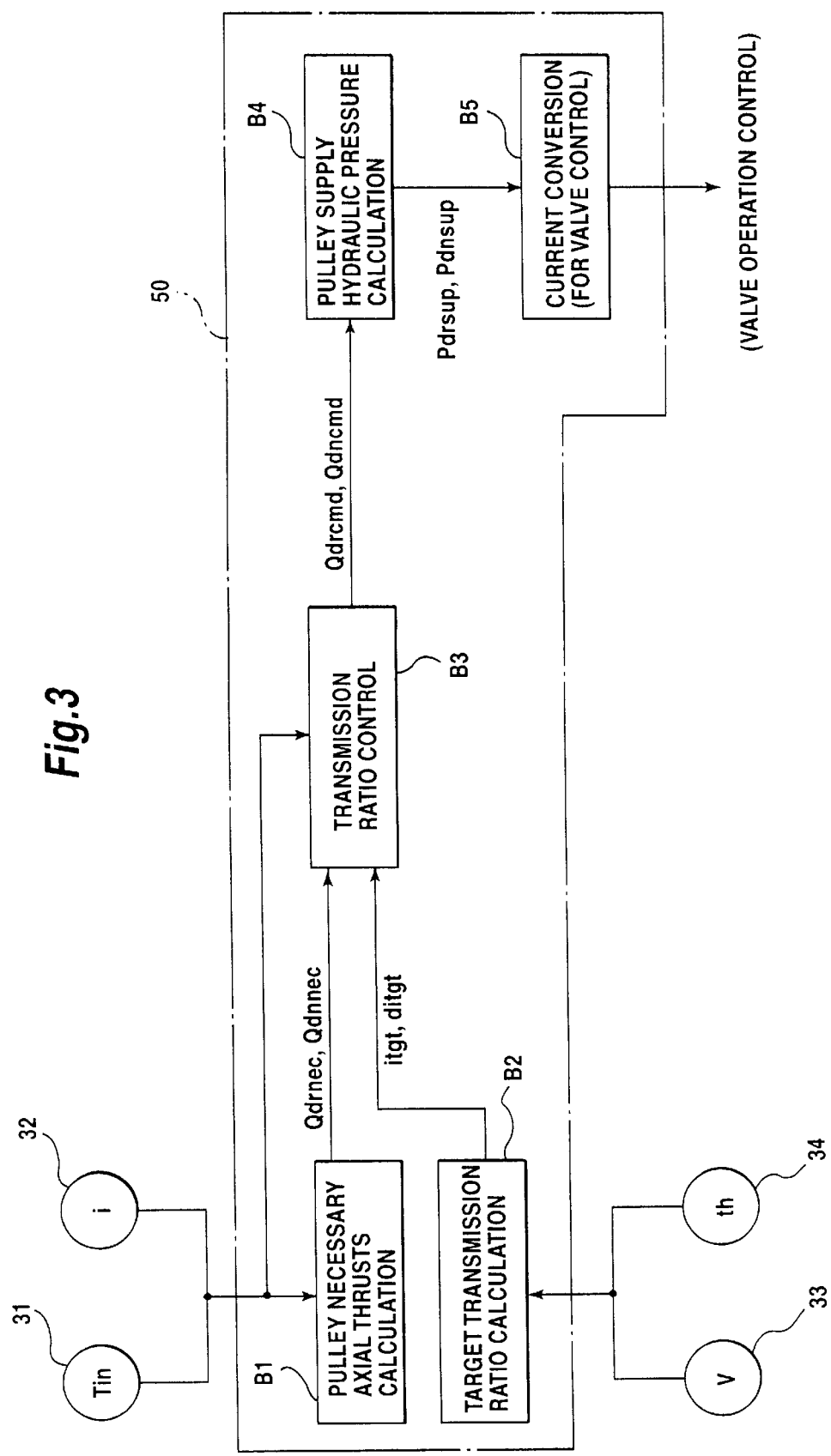
FIG. 3 is a block diagram showing details of transmission control according to the present invention.

In this control process, various operating conditions are detected and control is performed in accordance with these detected operating conditions. For this purpose, as shown in FIG. 3, this control device comprises: an input torque detector 31 that detects the transmission device input torque (torque input from engine E to input shaft 1) (Tin), transmission ratio detector 32 that detects the transmission ratio (i) in belt mechanism 10, vehicle speed sensor 33 that detects vehicle speed (V), and throttle degree of opening sensor 34 that detects the degree of engine throttle opening (th). Input torque detector 31 could be a detector that detects the input torque directly or could be a detector that finds the transmission device input torque by calculating the engine output torque from the engine suction negative pressure and the speed of rotation. Also, transmission ratio detector 32 could be a detector that detects the transmission ratio directly from the position of the movable pulley half in the axial direction or could be a detector that detects the rotational speed of the drive pulley and of the driven pulley and finds the transmission ratio from the ratio of these rotational speeds. The detection signals obtained from these are input to a controller (calculator) 50 where calculation processing (to be described) is performed, causing an operating control signal of a transmission ratio control valve that controls the hydraulic pressure that is supplied to the drive cylinder chamber and driven cylinder chamber 14 and 19 to be output. This transmission ratio control valve is for example a linear solenoid valve whose operation is controlled in response to the operating control signal received from controller 50 and that thereby controls the hydraulic pressure of drive cylinder chamber and driven cylinder chamber 14 and 19.

The calculation processing in this controller 50 will now be described. The transmission device input torque (Tin) signal detected by input torque detector 31 and the transmission ratio (i) signal detected by transmission ratio detector 32 are input to pulley necessary axial thrust calculating section B1. This then finds the drive pulley necessary axial thrust (Qdrnec) and the driven pulley necessary axial thrust (Qdnnec) which constitute the minimum necessary axial thrusts in the range such that belt slippage does not occur, in accordance with the input torque (Tin) and transmission ratio (i).

In parallel with this, the vehicle speed (V) signal detected by vehicle speed sensor 33 and the degree of engine throttle opening (th) signal detected by degree of engine throttle opening sensor 34 are input to target transmission ratio calculation section B2. The target transmission ratio (itgt) based on the vehicle speed (V) and degree of throttle opening (th) is then found, and in addition the target rate of change of transmission ratio (ditgt) i.e. the rate of change of this target transmission ratio (itgt) with time is found.

The transmission device input torque (Tin) signal detected by input torque detector 31 and the transmission ratio (i) signal detected by transmission ratio detector 32, the drive pulley necessary axial thrust (Qdrnec) and the driven pulley necessary axial thrust (Qdnnec) signals found by pulley necessary axial thrust calculating section B1, and the target transmission ratio (itgt) and target rate of change of transmission ratio (ditgt) signals found by target transmission ratio calculating section B2 are input to transmission ratio control section B3. Transmission ratio control section B3 uses these input signals to determine the target axial thrusts (Qdrcmd, Qdncmd) of the drive pulley and driven pulley needed in order that the current transmission ratio should change to the target transmission ratio (itgt) with the target rate of change of transmission ratio (ditgt).

The target axial thrust (Qdrcmd, Qdncmd) signals that are thus determined are input to pulley supplied hydraulic pressure calculating section B4, where the target supplied hydraulic pressures (Pdrsup, Pdnsup) of the drive cylinder chamber and driven cylinder chamber 14 and 19 necessary in order to obtain these target axial thrusts are found. Specifically, the target axial thrusts (Qdrcmd, Qdncmd) are divided by the pressure-receiving area of cylinder chambers 14 and 19 to find the necessary hydraulic pressures in the cylinders and these are compensated by a hydraulic pressure fluctuation element to find the target supplied hydraulic pressures (Pdrsup, Pdnsup).

The drive-side and driven-side target supplied hydraulic pressure signals (Pdrsup, Pdnsup) that are thus found are input to current conversion section B5 where the operating control current signals of the transmission ratio control valves that supply drive cylinder chamber and driven cylinder chamber 14 and 19 are found. These transmission ratio control valves are constituted by for example linear solenoid valves and their operation is controlled by the control currents found by a current conversion section B5, control being exercised such as to make the hydraulic pressures of drive cylinder chamber and driven cylinder chamber 14 and 19 the target supplied hydraulic pressures (Pdrsup, Pdnsup).

Figure 4:
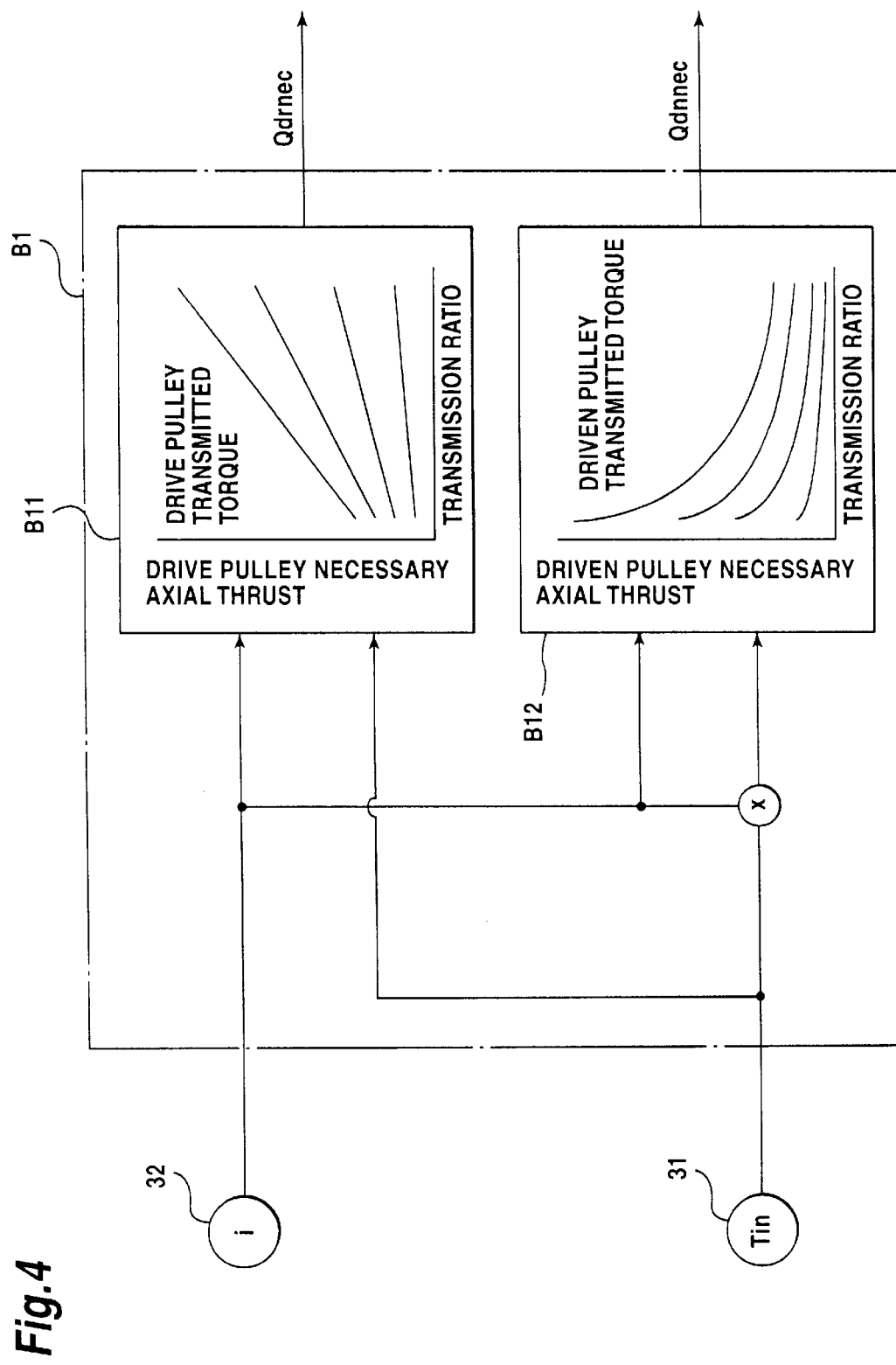
FIG. 4 is a block diagram showing in detail control block B1 in the block diagram of FIG. 3.

The detailed function of pulley necessary axial thrust calculating section B1 in the above control device is described with reference to FIG. 4. This pulley necessary axial thrust calculating section B1 comprises a drive pulley necessary axial thrust calculating section B11 and a driven pulley necessary axial thrust calculating section B12. Drive pulley necessary axial thrust calculating section B11 is provided with a drive pulley necessary axial thrust table corresponding to the transmission ratio (i) and the input torque (Tin) (=drive pulley transmission torque) and finds by table look-up the drive pulley necessary axial thrust (Qdrnec) corresponding to the transmission device input torque (Tin) detected by input torque detector 31 and the transmission ratio (i) detected by transmission ratio detector 32.

For its part, driven pulley necessary axial thrust calculating section B12 is provided with a driven pulley necessary axial thrust table corresponding to the transmission ratio (i) and the driven pulley transmitted torque (=input torque Tin×transmission ratio i) and finds by table look-up the driven pulley necessary axial thrust (Qdnnec) corresponding to the transmission ratio (i) and the driven pulley transmitted torque obtained by multiplying the transmission device input torque (Tin) by the transmission ratio (i).

Figure 5:
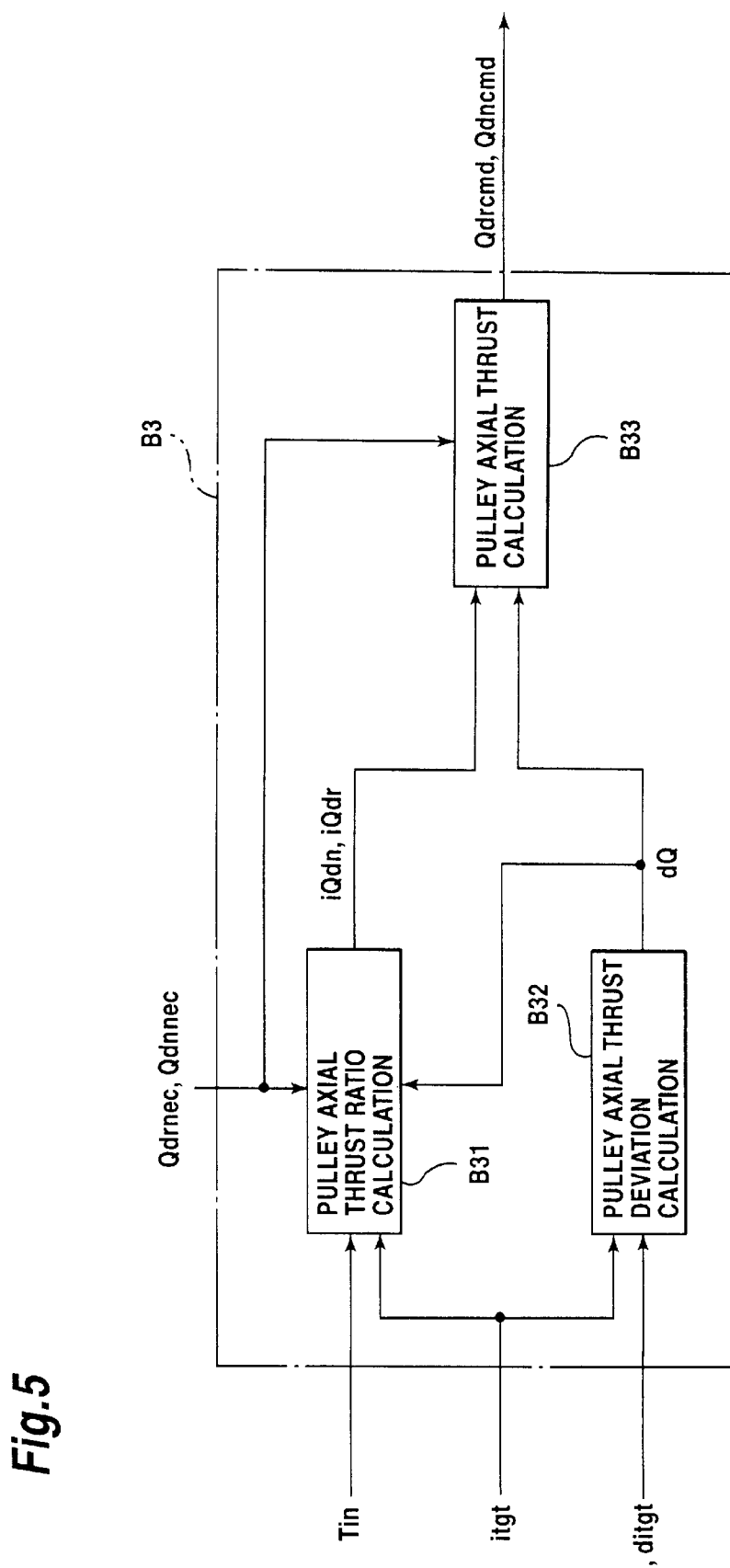
FIG. 5 is a block diagram showing in detail control block B3 in the block diagram of FIG. 3.

Next, detailed function of transmission ratio control section B3 in the above control device is described with reference to FIG. 5. Transmission ratio control section B3 comprises a pulley axial thrust ratio calculating section B31, a pulley axial thrust deviation calculating section B32, and a pulley axial thrust calculating section B33.

Pulley axial thrust ratio calculating section B31 finds the two pulley axial thrust ratios (iQdn, iQdr) which are the pulley axial thrust ratios necessary to balance out to the target transmission ratio (itgt) i.e. the pulley axial thrust ratios necessary for obtaining the target transmission ratio (itgt). The pulley axial thrust ratio is the value of (drive pulley axial thrust/driven pulley axial thrust). These two axial thrust ratios are the value applicable to the pulley axial thrust ratio when the driven pulley axial thrust has become the necessary axial thrust i.e. the pulley axial thrust ratio (iQdn) guaranteed at the driven pulley and the value applicable to the pulley axial thrust ratio when the drive pulley axial thrust has become the necessary axial thrust i.e. the pulley axial thrust ratio (iQdr) guaranteed at the drive pulley.

Pulley axial thrust deviation calculation section B32 finds, as the pulley axial thrust deviation (dQ), the total pulley axial thrust increase/decrease depending on the target rate of change of transmission ratio (ditgt) and feedback value for exercising control such that the current transmission ratio is changed to the target transmission ratio (itgt).

From the necessary axial thrusts of the two pulleys (Qdrnec, Qdnnec) found by pulley necessary axial thrust calculating section B1, the above two pulley axial thrust ratios (iQdn, iQdr), and the pulley axial thrust deviation (dQ), pulley axial thrust calculating section B33 determines the target axial thrusts of the two pulleys (Qdrcmd, Qdncmd) such that these conform to the relationship between the axial thrust ratio and axial thrust deviation and one pulley axial thrust necessarily becomes the necessary axial thrust.

Figure 6:
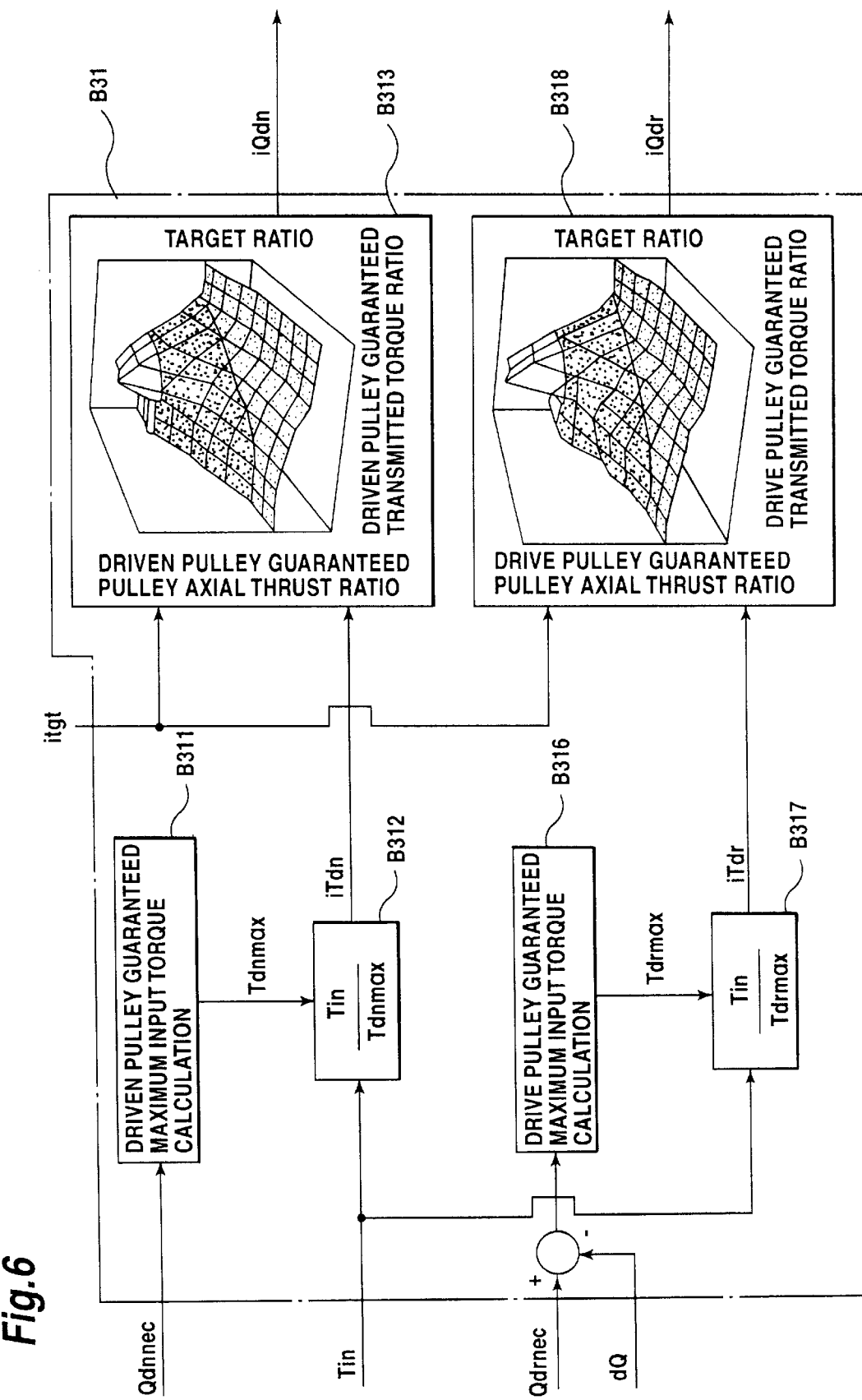
FIG. 6 is a block diagram showing in detail control block B31 in the block diagram of FIG. 5.

The function of pulley axial thrust ratio calculation section B31 will now be described in detail with reference to FIG. 6. The function of this calculating section B31 may be broadly divided into a transmitted torque ratio calculating function and a pulley axial thrust ratio determining function; these are duplicated depending on the pulley that is responsible for the necessary pulley axial thrust.

First of all, when the driven pulley is responsible for the necessary axial thrust, driven pulley guaranteed maximum input torque calculating section B311 finds the maximum input torque (Tdnmax) from the driven pulley necessary axial thrust (Qdnnec) and division section B312 divides the input torque (Tin) by the maximum input torque (Tdnmax), to find the driven pulley guaranteed transmitted torque ratio (iTdn). Furthermore, as shown in the drawing, pulley axial thrust ratio characteristic storage section B313 is provided with a table that stores the relationship between the target transmission ratio (i), the driven pulley guaranteed transmitted torque ratio (iTdn), and the driven pulley guaranteed pulley axial thrust ratio (iQdn), and finds, by table look-up, the driven pulley guaranteed pulley axial thrust ratio (iQdn) corresponding to the target transmission ratio (i) and the driven pulley guaranteed transmitted torque ratio (iTdn) found by division section B312.

When the drive pulley is responsible for the necessary axial thrust, drive pulley guaranteed maximum input torque calculating section B316 finds the maximum input torque (Tdrmax) from a value obtained by subtracting the pulley axial thrust deviation (dQ) from the drive pulley necessary axial thrust (Qdrnec) and division section B317 divides the input torque (Tin) by the maximum input torque (Tdrmax), to find the drive pulley guaranteed transmitted torque ratio (iTdr). Furthermore, as shown in the drawing, pulley axial thrust ratio characteristic storage section B318 is provided with a table that stores the relationship between the target transmission ratio (i), the drive pulley guaranteed transmitted torque ratio (iTdr), and the drive pulley guaranteed pulley axial thrust ratio (iQdr), and finds, by table look-up, the drive pulley guaranteed pulley axial thrust ratio (iQdr) corresponding to the target transmission ratio (i) and the drive pulley guaranteed transmitted torque ratio (iTdr) found by division section B317.

Figure 7:
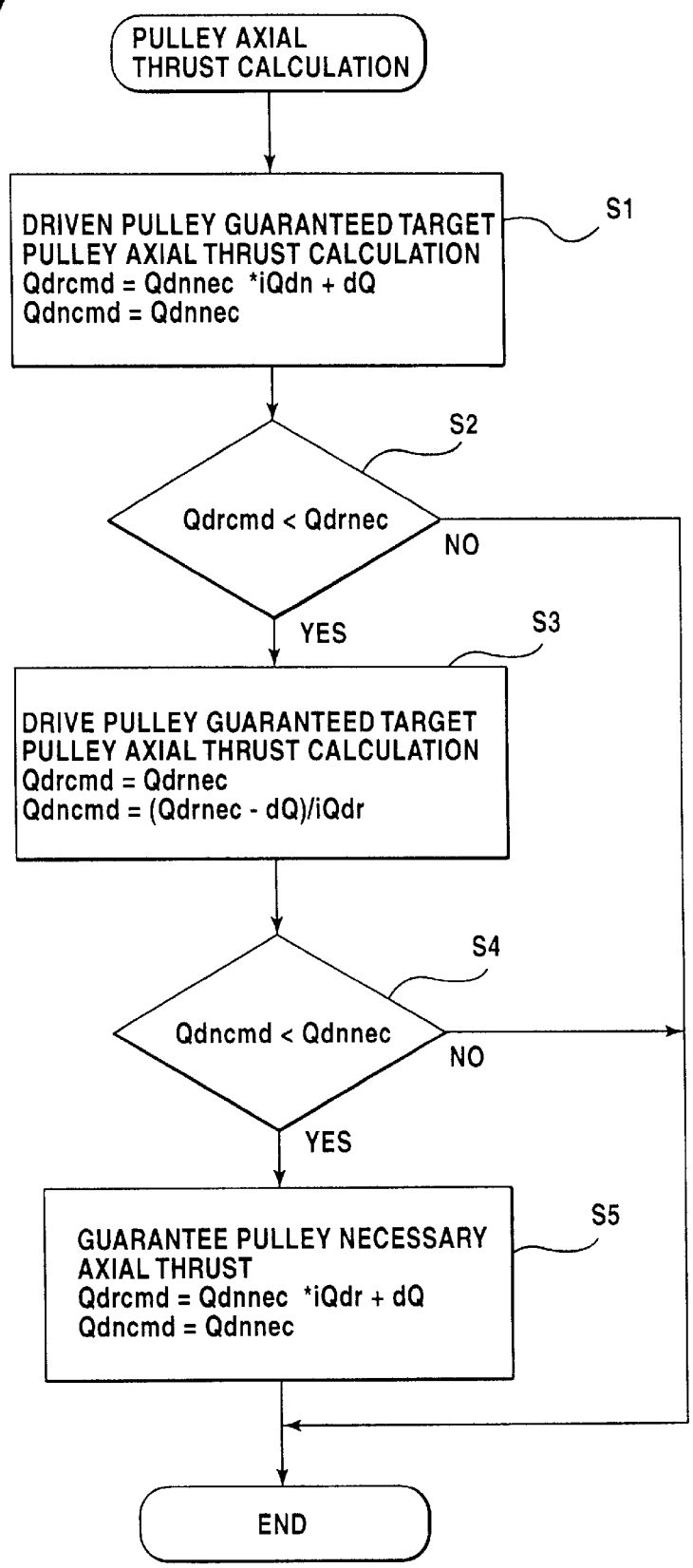
FIG. 7 is a flow chart showing details of transmission control according to the present invention.

Next, the details of the calculation processing by pulley axial thrust calculating section B33 will be described with reference to the flow chart of FIG. 7. First of all, assuming that the driven pulley is responsible for the necessary axial thrust, the result obtained by adding the pulley axial thrust deviation (dQ) to the product of the driven pulley necessary axial thrust (Qdnnec) and the driven pulley guaranteed axial thrust ratio (iQdn) is taken as the drive pulley target axial thrust (Qdrcmd) and furthermore the driven pulley necessary axial thrust (Qdnnec) is set as the driven pulley target thrust (Qdncmd) (step S1). Then, in step S2, the drive pulley target axial thrust (Qdrcmd) that was thus set and the drive pulley necessary axial thrust (Qdrnec) are compared, and, if Qdrcmd>Qdrnec, the results of the calculation of step S1 are directly taken as the target axial thrusts (Qdrcmd, Qdncmd).

On the other hand, if Qdrcmd<Qdncmd, processing advances to step S3, where, under the assumption that the drive pulley is responsible for the necessary axial thrust, the following calculation is performed. First of all, the drive pulley necessary axial thrust (Qdrnec) is set as the drive pulley target axial thrust (Qdrcmd) and the value obtained by dividing the result obtained by subtracting the pulley axial thrust deviation (dQ) from the drive pulley necessary axial thrust (Qdrnec) by the drive pulley guaranteed pulley axial thrust ratio (iQdr) is set as the driven pulley target axial thrust (Qdncmd). The thus-set driven pulley target axial thrust (Qdncmd) and driven pulley necessary axial thrust (Qdnnec) are then compared (step S4) and if Qdncmd≧Qdnnec the results of the calculation of step S3 are directly taken as the target axial thrusts (Qdrcmd, Qdncmd).

On the other hand, if Qdncmd<Qdnnec, processing advances to step S5 wherein the following processing is performed in order to ensure the necessary axial thrusts of both pulleys. Specifically, the value obtained by adding the pulley axial thrust deviation (dQ) to the product of the driven pulley necessary axial thrust (Qdnnec) and the drive pulley guaranteed pulley axial thrust ratio (iQdr) is set as the drive pulley target axial thrust (Qdrcmd) and the driven pulley necessary axial thrust (Qdnnec) is set as the driven pulley target axial thrust (Qdncmd).

Figure 8:
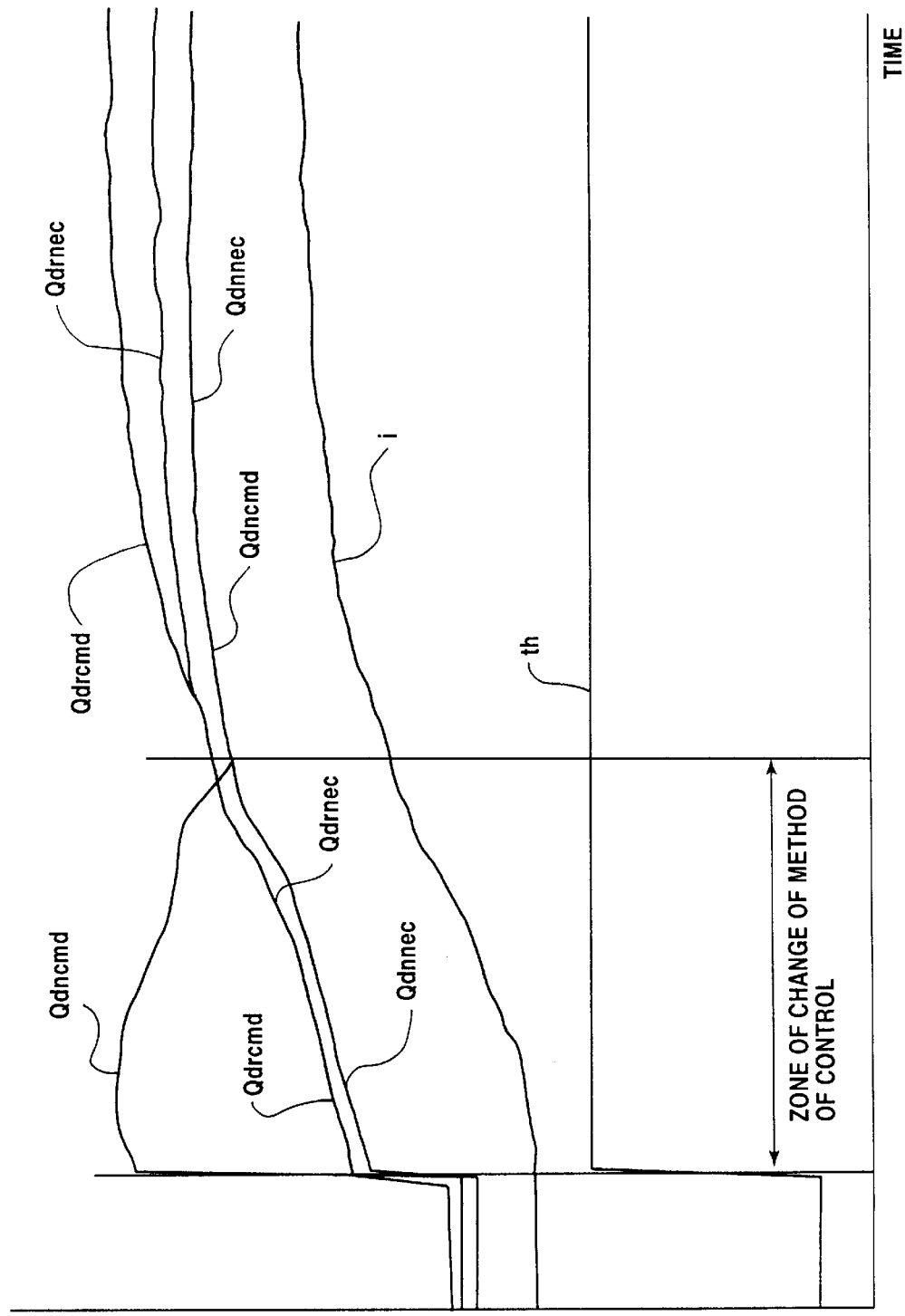
FIG. 8 is a graph showing the change with time of various data when transmission control is performed in according with the present invention.
Figure 9:
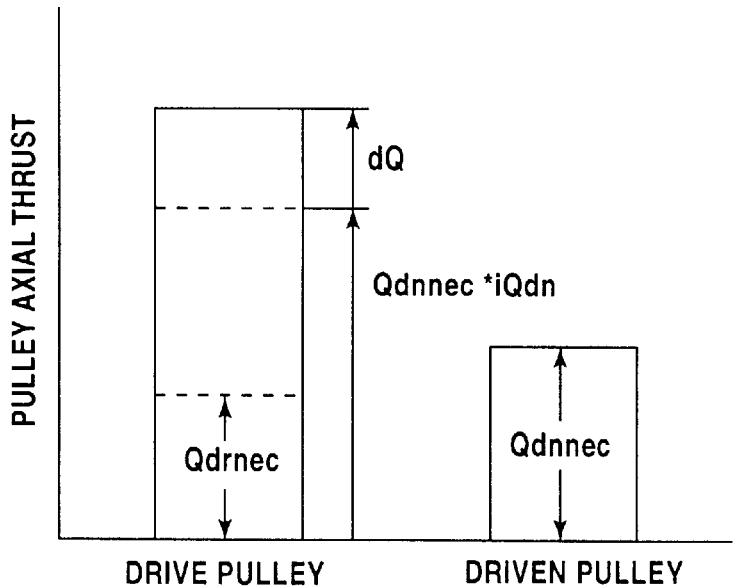
FIG. 9 and FIG. 10 are graphs showing the axial thrust relationship of the drive and driven pulleys when transmission control is performed in accordance with the present invention.

FIG. 8 shows an example of transmission control performed using the transmission control device constructed as described above. This illustrates transmission control when a step-wise change is effected of the throttle degree of opening (th) from fully-closed condition to the fully-open condition (i.e. in the event of so-called "kick-down"); the transmission ratio (i) is abruptly increased (i.e. changes to the "LOW" side). First of all, as shown in FIG. 9, the portion (portion in the initial period in this Figure) in which the degree of opening of the throttle corresponds to fully closed is a condition in which control is performed by the ordinary pulley axial thrust calculation method, the driven pulley being responsible for the necessary axial thrust while the drive pulley is responsible for the axial thrust necessary for maintaining the transmission ratio.

Figure 10:
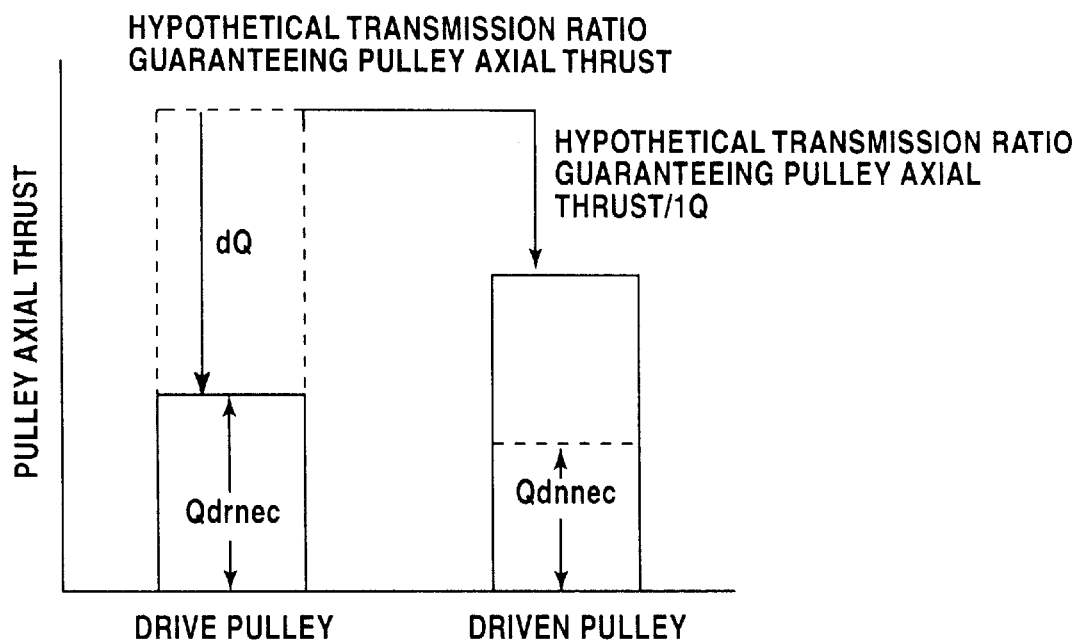

The portion indicated in FIG. 8 as the zone in which the method of control changes is the portion in which control having the characteristics of the present control is employed (i.e. portion in which control is performed that is different from normal): control is effected as shown in FIG. 10 in accordance with the method of pulley axial thrust calculation in the case of abrupt change of transmission ratio in the direction of increase of transmission ratio. Since in this portion the degree of throttle opening (th) becomes fully open, there is a large rise in the target transmission ratio (itgt), resulting in the pulley axial thrust deviation (dQ) assuming a large negative value; in the ordinary method of pulley axial thrust calculation this would result in a large drop of the axial thrust of the drive pulley, interrupting the necessary axial thrust (Qdrnec).

With the present control, the method of pulley axial thrust calculation in such an operating region is changed over to the method shown in FIG. 10. By this means, assuming a hypothetical steady condition maintained at the target transmission ratio at each time-point, the axial thrust of the drive pulley under these conditions is made a value obtained by subtracting the pulley axial thrust deviation (dQ) from the drive pulley necessary axial thrust (Qdrnec). Since the pulley axial thrust has a large negative value, the hypothetical transmission ratio-maintaining pulley axial thrust comes to have a large positive value, so the driven pulley axial thrust, which is found by dividing this value by the pulley axial thrust ratio (iQdr) increases in accordance with the pulley axial thrust deviation. On the other hand, since, for the axial thrust of the drive pulley, the drive pulley necessary axial thrust is set, this being a value obtained by adding the pulley axial thrust deviation to the hypothetical transmission ratio-maintaining pulley axial thrust, generation of excess axial thrust is prevented.

When subsequently the transmission ratio approaches the target value and its change becomes smaller, the pulley axial thrust deviation (dQ) also becomes small and the pulley axial thrust is controlled by the ordinary method of calculation of the pulley axial thrust illustrated in FIG. 9. In this way, even in the case of kick-down change of transmission ratio, belt slippage can be prevented while setting the minimum necessary pulley axial thrust, making possible smooth control of transmission ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. PH10-188371 filed on Jul. 3, 1998, which is incorporated herein by reference.

What is claimed is:

1. A method of controlling a transmission ratio in a belt-type stepless transmission device wherein engine output is transmitted to vehicle wheels by varying the transmission ratio in a stepless fashion by setting axial thrusts of a drive pulley and a driven pulley, the method comprising the following steps:

setting a target transmission ration and a target rate of change of transmission ratio based on a vehicle speed and a degree of accelerator opening;

determining a driven pulley necessary axial thrust and a drive pulley necessary axial thrust necessary to effect power transmission without causing belt slippage based on a transmission device input torque and a transmission ration;

setting said driven pulley necessary axial thrust as a driven pulley target axial thrust, setting the drive pulley necessary axial thrust as a drive pulley target axial thrust in order to change the transmission ratio to said target transmission ratio with said target rate of change of transmission ratio using said driven pulley target axial thrust;

comparing said drive pulley target axial thrust and said drive pulley necessary axial;

performing transmission ratio control using said drive pulley target axial thrust and said drive pulley target axial thrust if said drive pulley target axial thrust is greater than said drive pulley necessary axial thrust;

setting said drive pulley necessary axial thrust as the drive pulley target axial thrust if said drive pulley target axial thrust is less than said drive pulley necessary axial thrust, and, using said drive pulley necessary axial thrust, resetting the axial thrust deemed necessary at said driven pulley in order to change the transmission ratio to said target transmission ratio with said target rate of change of transmission ratio as the driven pulley target axial thrust; and performing transmission ratio control using the newly set drive pulley and driven pulley target axial thrusts.

2. The method of controlling the transmission ratio according to claim 1 wherein said drive pulley comprises a fixed drive pulley half arranged on an input shaft of the transmission device, a moveable drive pulley half that can be relatively moved in an axial direction in opposition to the fixed drive pulley half, and drive cylinder chamber arranged on a side of the movable drive pulley half; and said driven pulley comprises a fixed driven pulley half arranged on a counter shaft of the transmission device, a movable driven pulley half that can be relatively moved in the axial direction in opposition to the fixed driven pulley half, and a driven cylinder chamber arranged on the side of this movable driven pulley half, wherein the method comprises the following additional steps: generating axial thrust of said drive pulley by supplying hydraulic pressure into a drive cylinder chamber and generating axial thrust of said driven pulley by supplying hydraulic pressure into a driven cylinder chamber.

3. The method of controlling the transmission ratio according to claim 1 comprising the additional step of adding a pulley axial thrust deviation to a product of said driven pulley necessary axial thrust and a driven pulley guaranteed axial thrust ratio in said step of setting the drive pulley necessary axial thrust as a drive pulley target axial thrust, is determined by $$Qdrcmd = Qdnnec*iQdn + dQ.$$

4. The method of controlling the transmission ratio according to claim 1 comprising the additional step of setting said drive pulley target axial thrust by dividing a result obtained by subtracting a pulley axial thrust deviation from said drive pulley necessary axial thrust by a drive pulley guaranteed pulley axial thrust ratio in said step of resetting the axial thrust deemed necessary at said driven pulley in order to change the transmission ratio to said target transmission ratio with said target rate of change of transmission ratio is determined by $$Qdncmd = (Qdrnec - dQ)/iQdn.$$

5. The method of controlling the transmission ratio according to claim 1 further comprises the additional step of comparing said reset driven pulley target axial thrust and said driven pulley necessary axial thrust; wherein if said driven pulley target axial thrust is larger than said driven pulley necessary axial thrust, transmission ratio control is performed using said reset drive pulley and driven pulley target axial thrusts; and wherein if said driven pulley target axial thrust is smaller than said driven pulley necessary axial thrust resetting the drive pulley target axial thrust based on a value obtained by adding a pulley axial thrust deviation to a product of the driven pulley necessary axial thrust and the drive pulley guaranteed pulley axial thrust ratio, resetting the driven pulley necessary axial thrust as the driven pulley target axial thrust, and performing transmission ratio control using said reset drive pulley and driven pulley target axial thrusts.

\* \* \* \* \*